(12) United States Patent
Amendt et al.

(10) Patent No.: US 7,097,895 B2
(45) Date of Patent: Aug. 29, 2006

(54) CROSS LAMINATED ORIENTED PLASTIC FILM WITH INTEGRAL PAPERBOARD CORE

(75) Inventors: Charles E. Amendt, Houston, TX (US); Christopher C. E. Barnes, Houston, TX (US)

(73) Assignee: Illinois Tool Works Inc., Glenview, IL (US)

( * ) Notice: Subject to any disclaimer, the term of this patent is extended or adjusted under 35 U.S.C. 154(b) by 188 days.

(21) Appl. No.: 10/689,373

(22) Filed: Oct. 20, 2003

(65) Prior Publication Data

US 2005/0084662 A1 Apr. 21, 2005

(51) Int. Cl.
*B32B 23/06* (2006.01)

(52) U.S. Cl. ............... 428/105; 428/513; 428/515

(58) Field of Classification Search ............. 428/105, 428/513, 515
See application file for complete search history.

(56) References Cited

U.S. PATENT DOCUMENTS

| | | | |
|---|---|---|---|
| 3,120,333 A | 2/1964 | Seiple | 229/184 |
| 3,322,613 A | 5/1967 | Rasmussen | 428/484.1 |
| 3,574,668 A | 4/1971 | Cherney | 428/513 |
| 3,924,051 A | 12/1975 | Wiggins et al. | 428/520 |
| 3,954,933 A | 5/1976 | Rasmussen | 264/145 |
| 4,028,475 A | 6/1977 | Willdorf | 428/215 |
| 4,039,364 A | 8/1977 | Rasmussen | 156/164 |
| 4,258,848 A | 3/1981 | Akao et al. | 206/524.2 |
| 4,276,347 A | 6/1981 | Shimada et al. | 428/332 |
| 4,337,285 A | 6/1982 | Akao et al. | 428/35.3 |
| 4,360,550 A | 11/1982 | Asakura et al. | 428/34.3 |
| 4,364,984 A | 12/1982 | Wentworth | 428/106 |
| 4,442,147 A | 4/1984 | Schrimer | 138/140 |
| 4,489,112 A | 12/1984 | Wise et al. | 428/34.2 |
| 4,543,280 A | 9/1985 | Fujita et al. | 206/524.3 |
| 4,610,914 A | 9/1986 | Newsome | 428/216 |
| RE32,270 E | 10/1986 | Murray, Jr. | 428/335 |
| 4,806,398 A | 2/1989 | Martin, Jr. | 428/34.2 |
| 4,900,594 A | 2/1990 | Quick et al. | 428/34.2 |
| 4,908,253 A | 3/1990 | Rasmussen | 428/114 |
| 5,830,545 A | 11/1998 | Frisk | 428/34.7 |
| 5,910,353 A * | 6/1999 | Machlica | 428/195.1 |
| 5,981,011 A | 11/1999 | Overcash et al. | 428/40.9 |
| 6,083,580 A | 7/2000 | Finestone et al. | 428/34.2 |
| 6,284,344 B1 | 9/2001 | Barnes et al. | 428/98 |
| 6,436,547 B1 | 8/2002 | Toft et al. | 428/474.4 |

FOREIGN PATENT DOCUMENTS

| | | |
|---|---|---|
| CA | 989287 | 5/1976 |
| DE | 2 423 209 | 5/1974 |
| EP | 0 931 646 A2 | 7/1999 |
| EP | 0 540 637 B1 | 11/1999 |
| EP | 1 059 162 A2 | 12/2000 |
| WO | WO 92/01558 | 2/1992 |

\* cited by examiner

OTHER PUBLICATIONS

European Search Report and Annex Jun. 23, 2005 (2 pages).

*Primary Examiner*—D. S. Nakarani
(74) *Attorney, Agent, or Firm*—Mark W. Croll, Esq.; Donald J. Breh; Levenfeld Pearlstein, LLC

(57) ABSTRACT

A multi-layer lamination is formed from a core sandwiched between a first oriented plastic layer and a second oriented plastic layer. The orientations of the plastic layers cross at an angle between but not equal to zero degrees and 180 degrees relative to one another. A method for making the lamination is also disclosed.

5 Claims, 1 Drawing Sheet

CROSS LAMINATED ORIENTED PLASTIC FILM WITH INTEGRAL PAPERBOARD CORE

BACKGROUND OF THE INVENTION

The present invention relates to a laminate sheet construction. More particularly, the present invention relates to a laminated material having cross-laminated plastic film layers.

Cross-laminates of uniaxially oriented films from crystalline polymers are known to exhibit a number of beneficial properties including improved tear resistance, as for example is disclosed in Rasmussen, U.S. Pat. No. 3,322,613, the disclosure of which is incorporated herein by reference. A more modern discussion of forming multi-layer, oriented or "bias-cut" plastic films is described in Barnes et al., U.S. Pat. No. 6,284,344, the disclosure of which is incorporated herein by reference.

Despite advances in multi-layer film technology, use of such films as the strength layer in a laminated structure with paperboard are still characterized by relatively poor tear characteristics. In effect, the poor tear characteristics of the paperboard are imparted to the cross-laminated layers and the tear propagates through each of the layers. Also, in fabricating products, the dissimilar materials of such laminates can present a number of problems including poor adhesion of the film to the paper board surface, which can result in spalling and other undesirable characteristics in the finished laminated product.

Accordingly, there is a need for a highly tear resistant laminate. Preferably such a laminate is formed using known material and known manufacturing methods.

SUMMARY OF THE INVENTION

A multi-layer lamination has a core sandwiched between a first oriented plastic layer and a second oriented plastic layer. The orientations of the plastic layers cross at an angle between but not equal to zero degrees and 180 degrees. Preferably, the plastic layers cross at an angle of about ninety degrees. Also preferably, the core is paperboard.

The integral lamination of the paperboard as a core layer improves the overall tear resistance of the laminate by allowing the two oriented outer layers to act virtually independently of each other. In this manner, one lamination orientation and resulting stress field offsets the lamination orientation and stress field of the other layer at the paperboard layer. Advantageously, the structure is symmetrical with plastic film on both surfaces, which also allows for easier fabrication techniques. Such a plastic laminate (at the surfaces) also offers excellent printability and a permits use of a variety of known sealing methods for use in package fabrication.

These and other features and advantages of the present invention will be readily apparent from the following detailed description, in conjunction with the claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
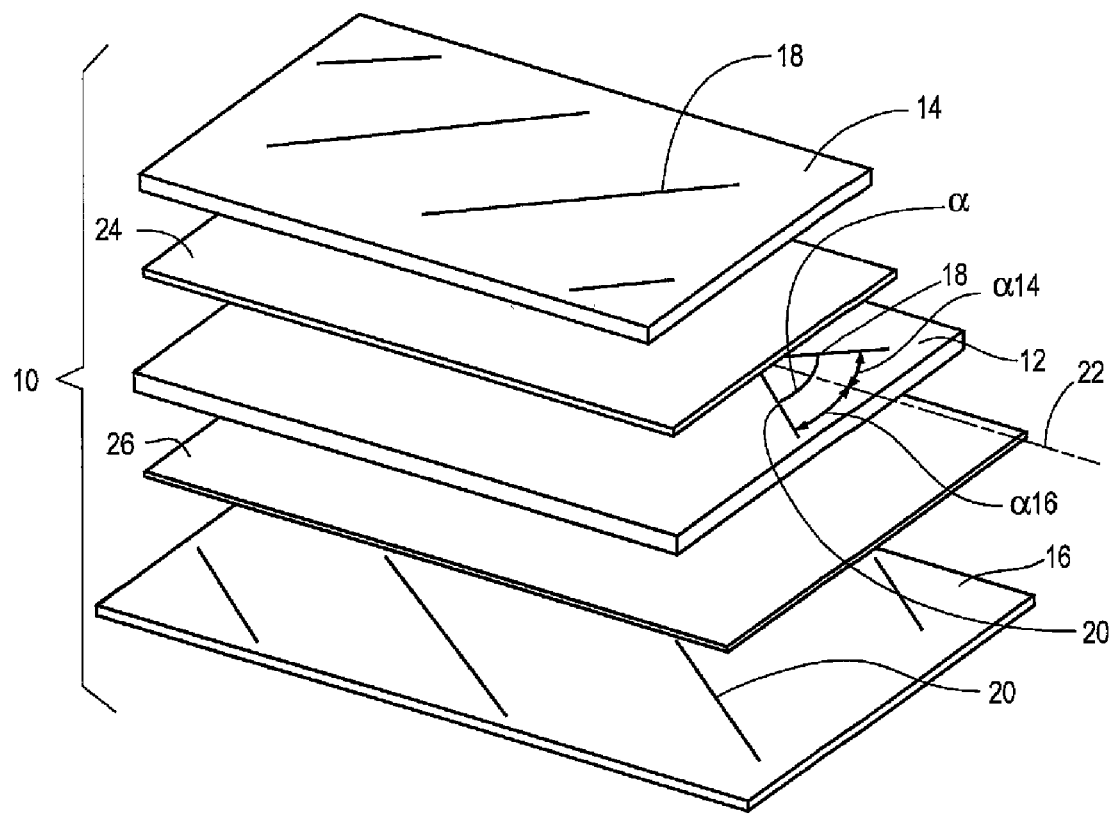
FIG. 1 is an exploded perspective view of a multi-layer lamination according to the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures and in particular to FIG. 1, there is shown a multi-layer lamination 10 in accordance with the principles of the present invention. The lamination (or laminate) 10 is formed from a core or substrate 12 that is sandwiched between a first oriented plastic layer 14 and a second oriented plastic layer 16. In a present laminate 10, the core 12 is paperboard. The direction of orientation of the first plastic layer 14 crosses the direction of orientation of the second plastic layer 16 at a predetermined angle $\alpha$ such that the orientations of the layers 14, 16 are non-parallel. That is, the plastic layer orientations cross one another at an angle a between but not equal to zero degrees and 180 degrees. As seen in FIG. 1, the orientation of layer 14 is indicated by the lines at 18 and the orientation of layer 16 is indicated by the lines at 20.

Relative to a reference direction of the core 12 (which reference direction is indicated at 22), the orientation angles $\alpha_{14}$, $\alpha_{16}$ of the layers 14, 16 can range from about 20 degrees to about 70 degrees, and are preferably between about 39 degrees and about 57 degrees. A most preferred orientation angle $\alpha_{14}$, $\alpha_{16}$ of each layer 14, 16 is about 45 relative to the core (or about 90 degrees to one another).

The plastic layers 14, 16 can be disposed directly on the core 12, or they can be adhered to the core 12 using a bonding layer 24, 26. In a present laminate 10, a bonding layer 24, 26 is disposed between each plastic layer and the core 12, which bonding layers are formed from a bonding media, such as low density polyethylene or the like.

A preferred material for the plastic or outer layers 14, 16 is a high density polyethylene (HDPE). Other suitable materials include polypropylene or a variety of other polyolefin materials and blends, so long as the material is capable of being oriented. A typical lamination 10 includes a bleached uncoated 12–20 point paperboard core 12 sandwiched between oriented plies 14, 16, each ply having a thickness of about one mil to about three 3 mils.

The laminated sandwich structure 10 combines the inherent strength and tear resistance of a cross-laminated film and the machine processability of paperboard. Such laminate structures 10 are useful for integration into pilfer resistant, high strength packages and other applications where high tear resistance offers an advantage over existing paperboard structures.

Those skilled in the art will recognize that the orientation of a plastic layer is a characteristic that is imparted to the film during manufacture. Typically, a polymer is melted and extruded into a bubble form from an extruder die. The film is then cooled, for example, using an annular air-ring (blown film process). The cooled bubble is collapsed to form layflat tubing which is then stretched. It is the extrusion and stretching operations that "orient" the film. Essentially, the long chain polymer molecules are oriented or directed as a result of the extrusion and stretching processes. The oriented layflat tubing so produced is then bias cut to produce a single layer of film where the orientation angle is at the desired angle to the machine direction.

Figure 2:
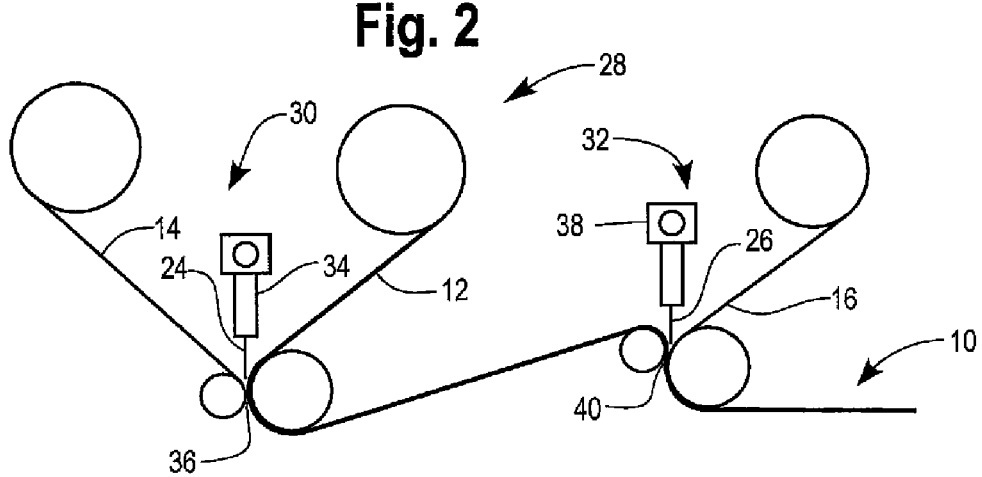
FIG. 2 is a schematic illustration of an exemplary process for making the multi-layer laminate.

One process (indicated generally at 28) for making the laminate 10 is illustrated schematically in FIG. 2 and is referred to as a tandem extrusion lamination process. In such a process, two stations 30, 32 are use to apply the cross-oriented laminate films 14, 16 (one station 30 for applying the first film 14 to one side of the paperboard core 12 and the other station 32 for applying the second film 16 to the other side of the paperboard core 12). In such a process, application of the films 14, 16 is carried out in sequence. That is, the first film layer 14 is applied to the paperboard core 12 at the first station 30. As illustrated, a bonding material 24 applicator 34 can be positioned so as to apply the bonding material 24 between the plastic layer 14 and the core 12 at about a roller nip 36.

The core 12 with the first layer 14 bonded thereto is then conveyed to the second 32 station at which the second film layer 16 is applied to the core 12/first layer 14 assembly in much the same manner as the first layer 14. That is, a second bonding material 26 applicator 38 is positioned so as to apply the bonding material 26 between the plastic layer 16 and the core 12/first layer 14 assembly at about a second roller nip 40. Alternately, the films 14, 16 can be applied to the core 12 in a simultaneous application process.

Samples of various materials, including the present lamination (or laminate material), were subjected to puncture and tear to determine the increased strength of the lamination. A first material was a lamination made in accordance with the present invention having (about) a 15 thousandths of an inch (15 mil) paperboard core 12 with a first oriented plastic layer 14 on one side of the core 12 and a second oriented plastic layer 16 on the other side of the core 12. The plastic layers 14, 16 were adhered to the core 12 by bonding or tie layers 24, 26. The plastic layers 14, 16 were each about 1.5 mil thick HDPE and the tie layers 24, 26 added thickness of about 0.5 mils for a total lamination thickness of about 18.5 mils. The plastic layers 14, 16 were oriented about 90 degrees from one another.

A third material include the same materials as the laminate assembled in a different manner. The third material included a paperboard core (about 15 mils) to which was applied a first tie layer, a first oriented plastic layer (about 1.5 mil layer of HDPE), a second tie layer and a second oriented plastic layer (about 1.5 mil layer of HDPE). The tie layers total about 0.5 mils in thickness. That is, the third layer used the same materials in the same amount, but in a different construction (paper-plastic-plastic instead of the laminate of the present invention plastic-paper-plastic). Again, the plastic layers were oriented about 90 degrees from one another.

Data for puncture resistance, Elmendorf tear resistance (in the machine direction) and puncture propagation tear (PPT) resistance were collected for each of the samples, as provided in Table 1 below.

TABLE 1

PUNCTURE AND TEAR RESISTANCE OF VARIOUS LAMINATE AND BASE MATERIALS

| Product | Puncture resistance (pounds-force) | Elmendorf Tear Resistance (gms-force) | PPT resistance (Newtons) |
| --- | --- | --- | --- |
| Paperboard | less than 15 | 375 | 30 |
| Paperboard-Plastic-Plastic construction | 22 | 1000 | 54 |
| Present lamination | 28 | 1400 | 61 |

As can be seen from the results above, the laminated material exhibited considerably greater resistance to failure than did the "raw" paperboard material. However, surprisingly, the present laminate (plastic-paperboard-plastic) construction exhibited considerably greater resistance to failure than did a laminate material formed from the same materials, in the same weights, but in a different construction. This was an unexpected and surprising result.

It also is contemplated that adhesive laminations could be used as an alternative to extrusion lamination. In such a process, it is anticipated that a polyurethane adhesive system is used. However, other polymeric adhesive system are also contemplated. Here too, there would likely be an advantage to using a two station laminator so that both plies of orientated material could be applied to the inner paperboard in one pass. Known adhesive lamination equipment includes stations at which adhesive is applied to one of the substrates. It is further anticipated that some arrangement of drying ovens is used (if necessary) to remove solvents or the like. The adhesive coated substrate can then be brought in contact with a second web in some form of nip to achieve bonding of the two.

Although the present laminate 10 is described in detail as having a paperboard core 12, it is anticipated that other materials may be used to form the core or substrate portion 12 of the laminate 10. For example, it is envisioned that biaxially oriented polypropylene (BOPP) films, oriented polypropylene (OPP) films, polyvinylchloride (PVC) films, polyethylene terephthalate (PET) and metallized polyethylene terephthalate (MPET) films, polyethylene and polyethylene derivative films, foils and nylon, as well as corrugated cardboard, wood products and corroplast, can be used as the core 12.

It should be further understood that the title of this section of this specification, namely, "Detailed Description Of The Invention", relates to a requirement of the United States Patent Office, and does not imply, nor should be inferred to limit the subject matter disclosed herein.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A multi-layer lamination comprising:
   a paperboard core sandwiched between a first contiguous monoaxially oriented plastic film layer and a second contiguous monoaxially oriented plastic film layer wherein the orientations of the plastic layers cross at an angle between but not equal to zero degrees and 180 degrees relative to one another.

2. The multi-layer film in accordance with claim 1 wherein the orientation of the first plastic layer is an angle selected between 20 degrees and 70 degrees relative to a reference line lying in a plane of the core and the orientation of the second plastic layer, relative to the reference line core, is an angle that is complimentary to the angle of the first plastic layer.

3. The multi-layer film in accordance with claim 1 wherein the first and second plastic layers are polyolefins.

4. The multi-layer film in accordance with claim 3 wherein the polyolefin is polyethylene.

5. The multi-layer film in accordance with claim 1 further comprising a bonding media disposed between the plastic layers and the core.

* * * * *

UNITED STATES PATENT AND TRADEMARK OFFICE
CERTIFICATE OF CORRECTION

PATENT NO. : 7, 097,895 B2 Page 1 of 1
APPLICATION NO. : 10/689373
DATED : August 29, 2006
INVENTOR(S) : Amendt et al.

It is certified that error appears in the above-identified patent and that said Letters Patent is hereby corrected as shown below:

Claim 2, line 67 should read:

"of the second plastic layer, relative to the reference line,"

Signed and Sealed this

Twenty-first Day of November, 2006

JON W. DUDAS
*Director of the United States Patent and Trademark Office*